(12) United States Patent
Jeon et al.

(10) Patent No.: US 12,534,482 B2
(45) Date of Patent: Jan. 27, 2026

(54) METHOD OF PRODUCING L-GLUFOSINATE

(71) Applicant: CJ CheilJedang Corporation, Seoul (KR)

(72) Inventors: Jinwoo Jeon, Seoul (KR); Joo Young Lee, Seoul (KR); Changsuk Lee, Seoul (KR); Hyunjin Kim, Seoul (KR); Jun Ok Moon, Seoul (KR); In Seok Oh, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 1234 days.

(21) Appl. No.: 17/415,096

(22) PCT Filed: Nov. 29, 2019

(86) PCT No.: PCT/KR2019/016789
§ 371 (c)(1),
(2) Date: Jan. 5, 2022

(87) PCT Pub. No.: WO2020/145514
PCT Pub. Date: Jul. 16, 2020

(65) Prior Publication Data
US 2022/0306658 A1 Sep. 29, 2022

(30) Foreign Application Priority Data

Jan. 11, 2019 (KR) .................. KR10-2019-0004164
Jan. 15, 2019 (KR) .................. KR10-2019-0005282
Jan. 15, 2019 (KR) .................. KR10-2019-0005283
Jan. 15, 2019 (KR) .................. KR10-2019-0005404
Jan. 15, 2019 (KR) .................. KR10-2019-0005405

(51) Int. Cl.
C07F 9/54 (2006.01)
C07C 231/00 (2006.01)
C07C 231/12 (2006.01)
C07D 307/33 (2006.01)
C07F 7/18 (2006.01)
C07F 9/30 (2006.01)
C07F 9/32 (2006.01)

(52) U.S. Cl.
CPC .......... C07F 9/5428 (2013.01); C07C 231/00 (2013.01); C07C 231/12 (2013.01); C07D 307/33 (2013.01); C07F 7/1896 (2013.01); C07F 9/301 (2013.01); C07F 9/3205 (2013.01); C07B 2200/07 (2013.01)

(58) Field of Classification Search
None
See application file for complete search history.

(56) References Cited

U.S. PATENT DOCUMENTS 5,442,088 A 8/1995 Hoffmann
2002/0146783 A1 10/2002 Maier et al.

FOREIGN PATENT DOCUMENTS

| CN | 1370836 | 9/2002 |
|---|---|---|
| CN | 101230000 | 7/2008 |
| CN | 101550100 | 10/2009 |
| CN | 106045947 | 10/2016 |
| CN | 106083922 | 11/2016 |
| CN | 106518695 | 3/2017 |
| CN | 108516991 | 9/2018 |
| KR | 20140116010 | 10/2014 |
| PL | 208845 | 6/2011 |
| RU | 2275376 | 4/2006 |
| WO | 2017/151573 | 9/2017 |
| WO | 2020-145513 | 7/2020 |

OTHER PUBLICATIONS

PubChem, aber GMbH "Acetyl-L-homoserine lactone", Available and deposit date Mar. 6, 2017 (Year: 2017).*
Machine translation of CN106083922, Nov. 9, 2016, pp. 1-8 (Year: 2016).*
Theodora W Greene et al., "Protection for the Amino Group", Protective Groups in Organic Synthesis, 3rd Edition, John Wiley & Sons, Inc, New York, pp. 494-653, XP009527465, Apr. 9, 1999.
EPO, Extended European search report of the corresponding EP Patent Application No. 19908870.9, dated Nov. 24, 2022.
Peter G.M.Wuts, "Greene's Protective Groups in Organic Synthesis", Fourth Edition, 2007, p. 706, 773.
J.-H. Lee et al., "In Vitro Characterization of a Heterologously Expressed Nomibosomal Peptide Synthetase Involved in Phosphinothricin Tripeptide Biosynthesis", Biochemistry, 2009, vol. 48, No. 23, pp. 5054-5056; doi: 10.1021/bi900164d.
G. Knaup et al., "O-Acetyl-L-homoserine: A versatile synthon for the synthesis of L-homoserine peptides and 3-amino-2-pyrrolidinones", Peptides for the New Millennium, Kluwer Academic publishers, 1999, vol. 16, pp. 66-67; doi: 10.1007/0-306-46881-6_2.
Zhou Zhong-qiang et al. "Synthesis of S-a-(methyloxycarbonyl) amino-g-butyrolactone" Chinese Journal of Pesticides vol. 45, No. 1 (Jan. 2006). pp. 22-23, 30. Only abstract translated.
KIPO, PCT Search Report & Written Opinion of PCT/KR2019/016789 dated Mar. 24, 2020.
Michael G. Hoffmann et al., "A Novel and Convenient Route to L-Homoserine Lactones and L-Phosphinothricin From L-Aspartic Acid", Tetrahedron Letters, 1992, 2669-2672.
Daniel M. Walker et al., "Design and Synthesis of y-Oxygenated Phosphinothricins as Inhibitors of Glutamine Synthetase", Journal of the Chemical Society, Perkin Transactions 1, 1990, 659-666.

(Continued)

Primary Examiner — Medhanit W Bahta
(74) Attorney, Agent, or Firm — LEX IP MEISTER, PLLC

(57) ABSTRACT

Provided is a method for preparing L-glufosinate from an L-homoserine derivative compound, the method including a step (step a) of preparing a compound of Chemical Formula 2 from a compound of Chemical Formula 1, and a step (step b) of preparing a compound of Chemical Formula 3 from the compound of Chemical Formula 2.

17 Claims, No Drawings

(56) References Cited

OTHER PUBLICATIONS

Daniel M. Walker et al., "Synthesis of D,L-γ-Hydroxyphosphinothricin, a Potent New Inhibitor of Glutamine Synthetase", Journal of the Chemical Society, Chemical Communications, 1987, 1710-1711.

Suneel P. Singh et al, "A Microwave-Assisted Synthesis of (S)-N-Protected Homoserine γ-Lactones from L-Aspartic Acid", J. Org. Chem. 2011, 76, 6825-6831.

Jennifer N. Beriault et al., "Phloem Transport of D,L-Glufosinate and Acetyl-L-Glufosinate in Glufosinate-Resistant and -Susceptible *Brassica napus*", Plant Physiology, Oct. 1999, vol. 121, pp. 619-627.

\* cited by examiner

METHOD OF PRODUCING L-GLUFOSINATE

TECHNICAL FIELD

The present invention relates to a method for preparing L-glufosinate.

BACKGROUND ART

Glufosinate is widely used as a broad-spectrum herbicide having penetrability, and it is known that the properties of the permeable herbicide glufosinate are the effects caused by an L-isomer of glufosinate. Thereby, various methods for preparing the L-isomer of glufosinate have been studied. For example, a method of preparing a L-isomer of glufosinate by selectively separating the L-isomer from a racemic mixture of D-isomer and L-isomer was used. Such a method has problems that the yield of L-isomer is reduced by a half or less, unwanted D-isomers are produced as excessive by-products, a resolving agent, a resolving device, and the like are required for the separation of the L-isomer, and thus, the process is complicated.

Therefore, there is a need to develop a method of preparing an L-isomer of glufosinate with high optical purity in a simple manner and in a high yield.

DETAILED DESCRIPTION OF THE INVENTION

Technical Problem

An object of the present application is to provide a method of preparing L-glufosinate with high optical purity in a simple manner and in a high yield.

Technical Solution

In one aspect, there is provided a method for preparing L-glufosinate from an L-homoserine derivative compound, the method comprising a step (step a) of preparing a compound of the following Chemical Formula 2 from a compound of the following Chemical Formula 1, and a step (step b) of preparing a compound of the following Chemical Formula 3 from the compound of Chemical Formula 2.

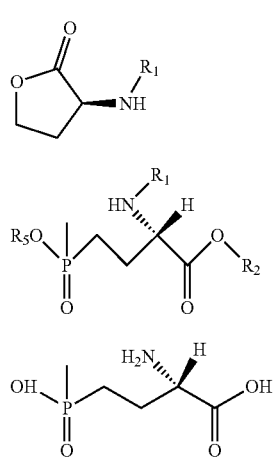

<Chemical Formula 1>
<Chemical Formula 2>
<Chemical Formula 3> where in the above formulas, $R_1$ is $R_a$—(C=O)—, where $R_a$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, a substituted or unsubstituted aryl group having 6 to 20 carbon atoms, or a substituted or unsubstituted heteroaryl group having 2 to 10 carbon atoms, $R_2$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, or a substituted or unsubstituted aryl group having 6 to 20 carbon atoms, a substituted or unsubstituted heteroaryl group having 2 to 10 carbon atoms, or —Si($R_b$)($R_c$)($R_d$), where $R_b$, $R_c$ and $R_d$ independently of one another are a substituted or unsubstituted alkyl group having 1 to 6 carbon atoms or a substituted or unsubstituted aryl group having 6 to 20 carbon atoms, $R_5$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, and substituents of the alkyl group, alkenyl group, alkynyl group, cycloalkyl group, aryl group, and heteroaryl group independently of one another are at least one selected from hydrogen, halogen, a carboxyl group (—COOH), an amino group (—$NH_2$), a nitro group (—$NO_2$), a cyano group (—CN), an alkyl group having 1 to 6 carbon atoms, an aryl group having 6 to 10 carbon atoms, and a cycloalkyl group having 3 to 10 carbon atoms.

Advantageous Effects

The method for preparing L-glufosinate according to one embodiment allows simple production of L-glufosinate with high optical purity by using a new intermediate compound and having a new synthetic route.

In addition, L-glufosinate can be prepared in high yield by a simple method.

DETAILED DESCRIPTION OF THE EMBODIMENTS

Hereinafter, a method for preparing L-glufosinate according to one embodiment will be described in more detail.

The inventive concept of the present application described below can be modified in various forms and can have various embodiments, and thus, specific embodiments will be illustrated and described in detail. However, the embodiments are not intended to limit the inventive concept of the present application, but it should be understood that the invention includes all modifications, equivalents, and replacements belonging to the technical scope of the inventive concept of the present application.

As used herein, terms such as first, second, third, fourth, and the like may be used to describe various components, but the components should not be limited by the terms. The terms are used only to discriminate one constituent element from another component.

The term 'L-glufosinate' as used herein is an L-isomer of glufosinate. The term 'D-glufosinate' as used herein is a D-isomer of glufosinate.

The term "% enantiomeric excess (% ee)' means the enantiomeric purity of a sample, that is, the percentage of one enantiomer that exceeds the other enantiomer in the sample. For example, the enantiomeric excess of L-glufosinate is the percentage of L-glufosinate that exceeds D-glufosinate in the glufosinate. For example, the enantiomeric excess of L-glufosinate is represented by Equation 1 below.

Enantiomeric excess of L-glufosinate=[(Content of L-glufosinate−Content of D-glufosinate)/(Content of L-glufosinate+Content of D-glufosinate)]×100  <Equation 1>

The method for preparing L-glufosinate intermediate according to one embodiment is a method for preparing L-glufosinate from an L-homoserine derivative compound, the method comprising a step (step a) of preparing a compound of the following Chemical Formula 2 from a compound of the following Chemical Formula 1, and a step (step b) of preparing a compound of the following Chemical Formula 3 from the compound of Chemical Formula 2.

<Chemical Formula 1>

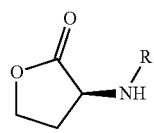

<Chemical Formula 2>

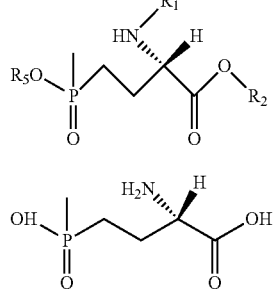

<Chemical Formula 3>

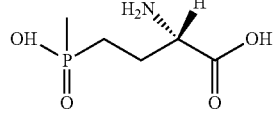

where in the above formulas, $R_1$ is $R_a$—(C=O)—, where $R_a$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, a substituted or unsubstituted aryl group having 6 to 20 carbon atoms, or a substituted or unsubstituted heteroaryl group having 2 to 10 carbon atoms, $R_2$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, or a substituted or unsubstituted aryl group having 6 to 20 carbon atoms, a substituted or unsubstituted heteroaryl group having 2 to 10 carbon atoms, or —Si($R_b$)($R_c$)($R_d$), where $R_b$, $R_c$ and $R_d$ independently of one another are a substituted or unsubstituted alkyl group having 1 to 6 carbon atoms or a substituted or unsubstituted aryl group having 6 to 20 carbon atoms.

$R_5$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, and substituents of the alkyl group, alkenyl group, alkynyl group, cycloalkyl group, aryl group, and heteroaryl group independently of one another are at least one selected from hydrogen, halogen, a carboxyl group (—COOH), an amino group (—NH$_2$), a nitro group (—NO$_2$), a cyano group (—CN), an alkyl group having 1 to 6 carbon atoms, an aryl group having 6 to 10 carbon atoms, and a cycloalkyl group having 3 to 10 carbon atoms.

More specifically, the step a may include a step (step c) of preparing a compound of the following Chemical Formula 4 by reacting the compound of Chemical Formula 1 with a halogenation agent and at least one $R_2$—OH.

<Chemical Formula 4>

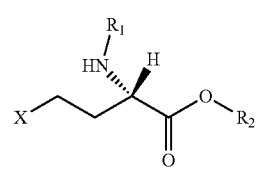

where in the above formula, $R_1$ and $R_2$ are as defined above, and X is halogen.

That is, the first intermediate compound represented by Chemical Formula 4 may be prepared by reacting the compound of Chemical Formula 1 with a halogenation agent and at least one $R_2$—OH. For example, the ring-opening reaction is proceeded by reacting the lactone compound represented by Chemical Formula 1 with a halogen of the halogenating agent, and then a substitution reaction with a $R_2$-functional group of the $R_2$—OH compound can proceed to thereby form a second intermediate compound.

<Chemical Formula 1>

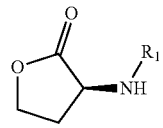

<Chemical Formula 4>

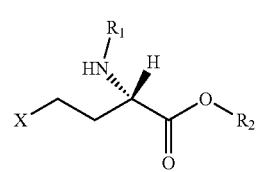

In the compound of Chemical Formula 1 and the first intermediate compound represented by Chemical Formula 4, for example, $R_1$ may be acetyl or succinyl, and $R_2$ may be methyl, ethyl, propyl, butyl, pentyl, hexyl, benzyl, phenyl, naphthyl, —Si(CH$_3$)(tert-butyl)$_2$, —Si(C$_6$H$_5$)$_2$(tert-butyl), —Si(iso-propyl)$_3$, —Si(C$_5$H$_6$)(CH$_3$)$_2$, —Si(C$_6$H$_5$)$_2$(CH$_3$), —Si(C$_5$H$_6$)$_3$, —Si(CH$_3$)$_3$, —Si(CH$_2$CH$_3$), —Si(CH$_2$CH$_3$)$_2$(CH$_3$), —Si(CH$_2$CH$_3$)(CH$_3$)$_2$, or —Si(tert-butyl)$_3$. As the compound of Chemical Formula 1 and the first intermediate compound represented by Chemical Formula 4 have such functional groups, L-glufosinate having improved optical purity can be more easily prepared.

The compound of Chemical Formula 1 may be prepared, for example, from a fermentation liquid containing a precursor of the compound of Chemical Formula 1. Therefore, it is possible to efficiently prepare L-glufosinate by using the compound of Chemical Formula 1 that is derived from the precursor of the compound of Chemical Formula 1 produced in the fermentation process.

The precursor of the compound of Chemical Formula 1 may be, for example, an L-homoserine derivative. The O-acetyl-L-homoserine derivative may be, for example, O-succinyl-L-homoserine, O-succinyl-L-homoserine, and the like which are an O-substituted form of L-homoserine. For example, the L-homoserine derivative, which is a precursor of the first intermediate compound, can be separated from the fermentation liquid, and the separated L-homoserine derivative can be subjected to ring formation reaction to prepare the compound of Chemical Formula 1.

Furthermore, by using an intermediate compound derived from a derivative of 0-substituted L-homoserine, use of an additional material is not required to introduce protecting groups for amino groups, and L-glufosinate can be prepared in a one-pot process, where all reactions are carried out in one reactor, which is thus efficient.

As used herein, the term 'fermentation liquid containing a precursor of a compound of Chemical Formula 1' may be a fermentation liquid containing the precursor of a compound of Chemical Formula 1 that is produced from a fermentation process. The fermentation liquid may be a fermentation liquid obtained by culturing microorganisms in a medium containing sugar, or alternatively, may be a fermentation liquid which is obtained by enzymatically converting a fermentation liquid obtained by culturing microorganisms. For example, the fermentation liquid containing a precursor of a compound of Chemical Formula 1 may be a fermentation liquid in which microorganisms are cultured in a medium containing sugar to directly produce a precursor of a compound of Chemical Formula 1, or a fermentation liquid containing a precursor of a compound of Chemical Formula 1 which is obtained by enzymatically converting an amino acid produced by culturing a microorganism in a medium containing sugar. The type of microorganisms used in the preparation of the fermentation liquid containing a precursor of a compound of Chemical Formula 1 is not particularly limited, and any microorganism capable of producing an L-homoserine derivative by direct fermentation or enzymatic conversion in the technical field be used. The fermentation liquid containing an L-homoserine derivative may be, for example, a fermentation liquid obtained by fermenting a medium containing O-succinyl-L-homoserine-producing strain CJM-BTJ/pCJ-MetA-CL (accession number: KCCM-10872) or 0-acetyl-L-homoserine-producing strain CJM-BTJA/pCJ-MetX-CL (accession number: KCCM-10873) disclosed in Example 2 of Korean Unexamined Patent Publication No. 10-2014-0116010.

The halogenating agent may include at least one selected from the group consisting of $SOCl_2$, oxalyl chloride, triethylsilane. $(CH_2CH_3)_3SiH$)+palladium chloride ($PdCl_2$)+ methyl iodide ($CH_3I$), $POCl_3$, $PCl_3$, $PCl_5$, $PBr_3$, $PI_3$, $H_2SO_4$+KBr, P+$Cl_2$, P+$Br_2$, P+$I_2$, $TiCl_4$, $ZnCl_2$ and $BBr_3$. The halogenating agent may be particularly triethylsilane $(CH_2CH_3)_3SiH$)+palladium chloride ($PdCl_2$)+methyl iodide ($CH_3I$) or $SOC_2$, and the like.

The content of the halogenating agent may be, for example, 1 to 10 equivalents, 1 to 5 equivalents, 1 to 4 equivalents, 1 to 3 equivalents, 1 to 2 equivalents, 1 to 1.5 equivalents, 0.1 to 1.3 equivalents, or 1 to 1.1 equivalents based on 1 equivalent of the compound of Chemical Formula 1.

At least one $R_2$—OH compound may be used in the reaction to form the first intermediate compound. When plural $R_2$—OH compounds are used, the respective $R_2$—OH compounds may be the same as or different from each other.

The $R_2$—OH compound may be, for example, at least one selected from the group consisting of methanol, ethanol, n-propanol, iso-propanol, butanol, pentanol, hexanol, benzyl alcohol, phenol and naphthol. By selecting the aforementioned materials as the $R_2$—OH compound, a first intermediate compound can be obtained in a higher yield from the compound of Chemical Formula 1.

The content of the $R_2$—OH compound may be, for example, 1 to 60 equivalents, 1 to 40 equivalents, 2 to 20 equivalents, or 3 to 10 equivalents based on 1 equivalent of the compound of Chemical Formula 1. The step of preparing the second intermediate compound may be carried out in the presence of a solvent, or may be carried out under neat conditions without a solvent. The solvent may be an organic solvent.

The organic solvent may be, for example, alcohol, toluene, benzene, tetrahydrofuran, acetone, chloroform, dichloromethane, acetonitrile, and the like, without being necessarily limited thereto, and any solvent used with a halogenating agent in the technical field may be used. Alcohol is, for example, methanol, ethanol, propanol, butanol, pentanol, and the like, without being limited thereto.

In the step of preparing the first intermediate compound, the halogenation/ring-opening reaction is carried out at a temperature of, for example, 20 to 100° C., 20 to 80° C., 30 to 70° C., or 40 to 60° C. In the step of preparing the first intermediate compound, the ring-opening reaction and/or the substitution reaction may be carried out, for example, for 0.1 to 30 hours, 1 to 30 hours, 5 to 30 hours, 10 to 30 hours, 15 to 25 hours, 17 to 23 hours, or 18 to 20 hours. As the halogenation reaction and the ring-opening reaction are carried out within the above temperature and time range, the first intermediate compound may be more easily prepared.

In the step of preparing the first intermediate compound, the yield of the first intermediate compound may be, for example, 10% or more, 20% or more, 30% or more, 40% or more, 50% or more, 60% or more, 70% or more, 80% or more. 90% or more, 95% or more, 96% or more, 97% or more, 98% or more, or 99% or more.

In the step of preparing the first intermediate compound, the enantiomeric excess of the first intermediate compound having L-form may be, for example, 10% ee or more, 20% ee or more, 30% ee or more, 40% ee or more, 50% ee or more, 60% ee or more, 70% ee or more, 80% ee or more, 90% ee or more, 91% ee or more, 92% ee or more, 93% ee or more, 94% ee or more, 95% ee or more, 96% ee or more, 97% ee or more, 98% ee or more, or 99% ee or more.

Then, the step a may include a step (step d) of preparing the compound of Chemical Formula 2 by reacting the compound of Chemical Formula 4 with a compound of the following Chemical Formula 5 after the step c.

<Chemical Formula 5>

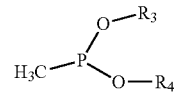

where in the above formula, $R_3$ and $R_4$ independently of one another are hydrogen, a substituted or unsubstituted alkyl group having 1 to 6 carbon atoms, a substituted or unsubstituted alkenyl group having 1 to 6 carbon atoms, or a substituted or unsubstituted alkynyl group having 1 to 6 carbon atoms.

Next, in the step of preparing a second intermediate compound represented by Chemical Formula 2, a second intermediate compound represented by the following Chemical Formula 4 can be prepared by reacting a first intermediate compound and a first acid with a phosphorus-based compound represented by the following Chemical Formula 5, or by reacting a first intermediate compound with a phosphorus-based compound represented by the following Chemical Formula 5 without a first acid. That is, a second intermediate compound represented by the following Chemical Formula 2 may be obtained by reacting the compound of Formula 4 with a phosphorus-based compound.

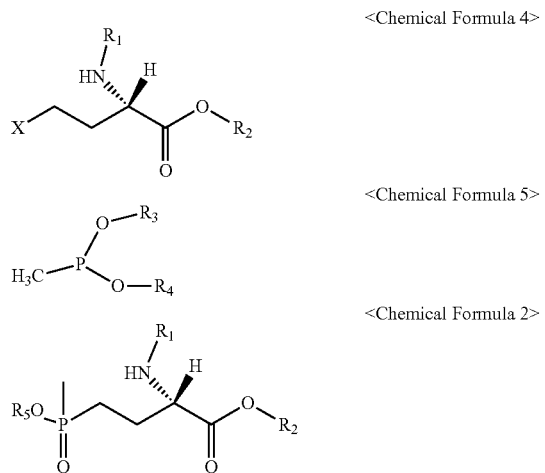

In the first intermediate compound represented by Chemical Formula 4, the phosphorus-based compound represented by Chemical Formula 5, and the second intermediate compound represented by Chemical Formula 2, for example, $R_1$ may be acetyl or succinyl, and $R_2$ may be hydrogen, methyl, ethyl, propyl, butyl, pentyl, hexyl, benzyl, phenyl, naphthyl, —Si(CH$_3$)(tert-butyl)$_2$, —Si(C$_6$H$_5$)$_2$(tert-butyl), —Si(isopropyl)$_3$, —Si(C$_5$H$_6$)(CH$_3$)$_2$, —Si(C$_6$H$_5$)$_2$(CH$_3$), —Si(C$_5$H$_6$)$_3$, —Si(CH$_3$)$_3$, —Si(CH$_2$CH$_3$)$_3$, —Si(CH$_2$CH$_3$)$_2$(CH$_3$), —Si(CH$_2$CH$_3$)(CH$_3$)$_2$, or —Si(tert-butyl)$_3$, $R_3$ and $R_4$ may be each independently any one selected from the group consisting of methyl, ethyl, propyl, butyl, pentyl and hexyl, and $R_5$ may be $R_3$ or $R_4$. As the first intermediate compound represented by Chemical Formula 4, the phosphorus-based compound represented by Chemical Formula 5, and the second intermediate compound represented by Chemical Formula 2 have such functional groups, L-glufosinate having improved optical purity can be more easily prepared.

The phosphorus-based compound represented by Chemical Formula 5 may be particularly alkylmethylphosphonite, for example diethylmethylphosphonite (DMP) or ethylmethylphosphinate (EMP), or butylmethylphosphinate (BMP).

The phosphorus-based compound represented by Chemical Formula 5 may be used in an amount of 0.5 to 10 equivalents. 0.7 to 8 equivalents, 0.9 to 7 equivalents, or 1 to 6 equivalents based on 1 equivalent of the first intermediate compound represented by Chemical Formula 4.

The first acid is, for example. Lewis acid, and the Lewis acid may be, for example, at least one selected from KF+Al$_2$O$_3$, ZnCl$_2$ LiBr, ZnBr$_2$, BF$_3$-Et$_2$O (diethylether), COCl$_2$, MgBr$_2$, Bu$_3$P, Sc(OTf)$_3$ (OTf=trifluoromethanesulfonate), Sc(NTf$_2$)$_3$ (scandium(III) trifluoromethanesulfonimide), TiCl$_3$-2AgClO$_4$, TiCl$_3$(OTf), Sn(OTf)$_2$, TMSOTf (TriMethylSilyl trifluoromethanesulfonate). La(OTf)$_3$, Cu(OTf)$_2$, and TaCl$_5$, and in particular, it may be KF+Al$_2$O$_3$.

The content of the first acid may be, for example, 0.1 to 100 parts by weight, 0.1 to 50 parts by weight, 0.1 to 40 parts by weight, 0.1 to 30 parts by weight, 0.1 to 20 parts by weight, 0.1 to 10 parts by weight, 0.1 to 5 parts by weight, or 0.1 to 2 parts by weight based on 100 parts by weight of the compound of Chemical Formula 4. When the content of the fourth acid is too low, it may have a slight effect on the reaction rate, and when the content of the first acid is too high, by-products may increase.

By using the first acid, the second intermediate compound can be obtained in a further improved yield. In the step of preparing the second intermediate compound, the reaction may be carried out at a temperature of, for example, 80 to 180° C., 80 to 160° C., 90 to 160° C. 90 to 150° C., 100 to 160° C., 100 to 150° C., 100 to 140° C., 110 to 160° C., 110 to 150° C., 110 to 160° C., 110 to 140° C., 120 to 160° C., 120 to 150° C., or 120 to 140° C. Meanwhile, when an acid is added, the reaction temperature may be, for example, 80 to 160° C., and when no acid is added, the reaction time may increase and the reaction temperature may increase. For example, when an acid is not used, the reaction temperature may be 120 to 180° C. In the step of preparing the second intermediate compound, the reaction may be carried out, for example, for 0.1 to 20 hours, 1 to 20 hours, 1 to 18 hours, 5 to 15 hours, 6 to 14 hours, 8 to 14 hours, 10 to 14 hours, or 11 to 13 hours. As the reaction is carried out within the above temperature range and time range, the second intermediate compound can be more easily prepared.

In the step of preparing the second intermediate compound, the yield of the second intermediate compound may be, for example, 10% or more, 20% or more, 30% or more, 40% or more, 50% or more, 60% or more, 70% or more, 80% or more, 90% or more, 95% or more, 96% or more, 97% or more. 98% or more, or 99% or more.

In the step of preparing the second intermediate compound, the enantiomeric excess of the second intermediate compound with L-form may be, for example, 10% ee or more, 20% ee or more, 30% ee or more. 40% ee or more, 50% ee or more, 60% ee or more. 70% ee or more, 80% ee or more, 90% ee or more, 91% ee or more, 92% ee or more, 93% ee or more, 94% ee or more, 95% ee or more, 96% ee or more, 97% ee or more, 98% ee or more, or 99% ee or more.

According to one embodiment, the step (step a) may include a step (step a-1) of preparing the compound of Chemical Formula 2 by reacting the compound of Chemical Formula 1 with a halogenating agent, at least one $R_2$—OH and a compound of the following Chemical Formula 5.

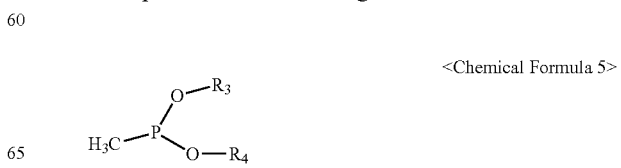

where in the above formula, $R_3$ and $R_4$ independently of one another are hydrogen, a substituted or unsubstituted alkyl group having 1 to 6 carbon atoms, a substituted or unsubstituted alkenyl group having 1 to 6 carbon atoms, or a substituted or unsubstituted alkynyl group having 1 to 6 carbon atoms.

Specifically, $R_1$ may be acetyl or succinyl, and $R_2$—OH may be at least one selected from the group consisting of methanol, ethanol, n-propanol, iso-propanol, butanol, pentanol hexanol, benzyl alcohol, phenol and naphthol. Further, $R_3$ and $R_4$ may include any one selected from the group consisting of methyl, ethyl, propyl, butyl, pentyl and hexyl. As the compound of Chemical Formula 1, the phosphorus-based compound represented by Chemical Formula 5, and the second intermediate compound represented by Chemical Formula 2 have such functional groups, L-glufosinate having improved optical purity can be more easily prepared.

The phosphorus-based compound represented by Chemical Formula 5 may be particularly alkylmethylphosphonite, for example, dietlylmethylphosphonite (DMP) or ethylmethylphosphinate (EMP), or butylmethylphosphinate (BMP).

The phosphorus-based compound represented by Chemical Formula 5 may be used in an amount of 0.5 to 10 equivalents, 0.7 to 8 equivalents, 0.9 to 7 equivalents, or 1 to 6 equivalents based on 1 equivalent of the compound of Chemical Formula 1.

The halogenating agent may include, for example, at least one selected from the group consisting of HCl, HBr, HI, phosgene, $SOCl_2$, oxalyl chloride, TriMethylSilyl halide, sodium iodide (NaI), triethylsilane, $(CH_2CH_3)_3SiH)$+Palladium chloride $(PdCl_2)$+methyl iodide $(CH_3I)$, $POCl_3$, $PCl_3$, $PCl_5$, $PBr_3$, $PI_3$, $H_2SO_4$+KBr, $P+Cl_2$, $P+Br_2$, $P+I_2$, $TiCl_4$, $ZnCl_2$ and $BBr_3$.

In the step of preparing a second intermediate compound by reacting the compound of Chemical Formula 1 with a halogenating agent, at least one $R_2$—OH compound, and a phosphorus-based compound, the halogenating agent may be particularly trimethylsilyl halide, sodium iodide (NaI) and the like. The content of the halogenating agent may be, for example, 0.1 to 10 equivalents, 0.2 to 8 equivalents, 0.3 to 6 equivalents, or 0.5 to 5 equivalents based on 1 equivalent of the compound of Chemical Formula 1.

At least one $R_2$—OH compound may be used in the reaction to form a second intermediate compound. When plural $R_2$—OH compounds are used, the respective $R_2$—OH compounds may be the same as or different from each other.

The $R_2$—OH compound may be, for example, at least one selected from the group consisting of methanol, ethanol, n-propanol, iso-propanol, butanol, pentanol, hexanol, benzyl alcohol, phenol and naphthol. By selecting the above materials as the $R_2$—OH compound, a second intermediate compound can be obtained in a higher yield from the compound of Chemical Formula 1.

The content of the $R_2$—OH compound may be, for example, 1 to 60 equivalents, 1 to 40 equivalents, 1 to 40 equivalents, or 2 to 20 equivalents, or 3 to 10 equivalents, based on 1 equivalent of the compound of Chemical Formula 1.

When a second intermediate compound represented by Chemical Formula 2 is prepared using a compound of Chemical Formula 1, a halogenating agent and a phosphorus-based compound of Chemical Formula 5, the reaction may be carried out at a temperature of 80 to 180° C., 80 to 160° C., 90 to 160° C., 90 to 150° C., 100 to 160° C., 100 to 150° C., 100 to 140° C., 110 to 160° C., 110 to 150° C., 110 to 160° C., 110 to 140° C. 120 to 160° C., 120 to 150° C., or 120 to 140° C. The reaction may be specifically carried out for 0.1 to 20 hours.

For specific reaction conditions, refers to the step of preparing a second intermediate compound represented by Chemical Formula 2 from the compound of Chemical Formula 1 described above.

In the step of preparing the second intermediate compound, the yield of the second intermediate compound and the enantiomeric excess of the second intermediate compound having L-form are the same as described above.

According to one embodiment, the step b of preparing L-glufosinate of Chemical Formula 3 from the compound of Chemical Formula 2 may be carried out by hydrolyzing the compound of Chemical Formula 2 under an acid catalyst. That is, the second intermediate compound of Chemical Formula 4 can be reacted with a second acid (acid catalyst) to remove terminal functional groups by hydrolysis, thereby preparing L-glufosinate represented by Chemical Formula 3.

The second acid may be, for example, at least one selected from the group consisting of HCl, $H_2SO_4$, and a combination of KF and $Al_2O_3$(KF+$Al_2O_3$), but the second acid is not necessarily limited thereto, and can be used without limitation as long as it is used as an acid catalyst in the technical field. The second acid may be particularly hydrochloric acid.

The content of the second acid may be, for example, 0.1 to 100 parts by weight, 0.1 to 50 parts by weight, 0.1 to 40 parts by weight, 0.1 to 30 parts by weight, 0.1 to 20 parts by weight, 0.1 to 10 parts by weight, 0.1 to 5 parts by weight, or 0.1 to 2 parts by weight, based on 100 parts by weight of the second intermediate compound represented by Chemical Formula 2. When the content of the second acid is too low, it may have a slight effect on the reaction rate, and when the content of the second acid is too high, by-products may increase.

When the solvent is water during use of the second acid, the pH of the aqueous solution containing water may be 1 to 3. That is, in the step of preparing the fourth intermediate compound, the reaction solution may be an acidic aqueous solution with a pH of 1 to 3. As the reaction solution has a pH in this range, the fourth intermediate compound can be more easily prepared.

In the step of preparing L-glufosinate, the hydrolysis reaction may be carried out at a temperature of, for example, 20 to 150° C., 40 to 140° C., 60 to 130° C., 80 to 120° C., or 90 to 110° C. In the step of preparing L-glufosinate, the hydrolysis reaction may be carried out, for example, for 0.1 to 30 hours, 1 to 20 hours, 1 to 15 hours, 3 to 13 hours, 4 to 12 hours, 5 to 11 hours, 6 to 10 hours, 7 to 9 hours, 10 to 30 hours, 12 to 24 hours, 15 to 20 hours, or 15 to 18 hours. As the hydrolysis reaction is carried out within the above temperature range and time range, L-glufosinate can be more easily prepared.

In the step of preparing the L-glufosinate, the yield of L-glufosinate may be, for example, 10% or more, 20% or more, 30% or more, 40% or more, 50% or more, 60% or more, 70% or more, 80% or more, 90% or more, 95% or more, 96% or more, 97% or more, 98% or more, or 99% or more.

The enantiomeric excess of the prepared L-glufosinate may be, for example, 10% ee or more, 20% ee or more, 30% ee or more, 40% ee or more, 50% ee or more, 60% ee or more, 70% ee or more, 80% ee or more, 90% ee or more, 91% ee or more, 92% ee or more, 93% ee or more, 94% ee or more, 95% ee or more, 96% ee or more, 97% ee or more, 98% ee or more, or 99% ee or more. As L-glufosinate has such an improved optical purity, for example, a further improved herbicide effect can be provided.

In the present invention, L-glufosinate may include its salt form. Specifically, the salt of L-glufosinate may be, for example, hydrochloride of L-glufosinate, sulfate of L-glufosinate, carbonate of L-glufosinate, ammonium salt of L-glufosinate, and the like, but are not necessarily limited thereto, and the salt can be used without limitation as long as it a salt of L-glufosinate obtained by the above-described glufosinate preparation method.

According to the present invention, it is possible to simply prepare L-glufosinate having high optical purity in high yield by going through a synthetic route using the first intermediate compound of Chemical Formula 1.

Additionally, the compound of Chemical Formula 1 can be prepared by a process in which an L-homoserine derivative represented by the following Chemical Formula 6 is reacted with a first base to prepare a third intermediate compound represented by the following Formula 7, and then the third intermediate compound is reacted with a third acid. That is, before the step a or the step a-1, the method may further include a step of preparing a third intermediate compound represented by Chemical Formula 7 by reacting an L-homoserine derivative represented by the following Chemical Formula 6 with a first base; and a step of preparing the compound of Chemical Formula 1 by reacting the third intermediate compound with the third acid.

More specifically, an L-homoserine derivative represented by the following Chemical Formula 6 can be reacted with a first base to prepare a third intermediate compound represented by the following Chemical Formula 7.

In the L-homoserine derivative represented by Chemical Formula 6, the $R_a(C=O)$-functional group represented by $R_1$ can be bonded to nitrogen in the third intermediate compound represented by Chemical Formula 7 by a functional group transfer reaction under the first base catalyst. For example, in the L-homoserine derivative represented by Chemical Formula 6, the functional group represented by $R_1$ can be bonded to nitrogen in the third intermediate compound represented by Formula 7 through a functional group transfer reaction under the first base, and thereby act as a protecting group of amines.

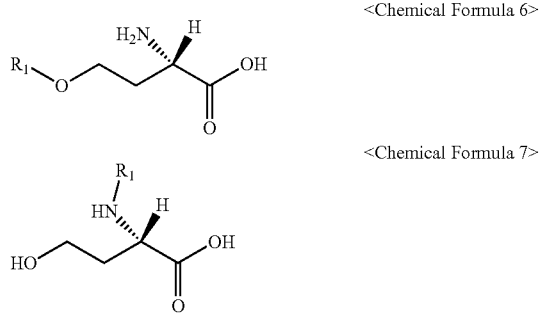

<Chemical Formula 6>

<Chemical Formula 7> where in the above formulas.

$R_1$ is $R_e$—(C=O)—, where $R_e$ is a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, a substituted or unsubstituted aryl group having 6 to 20 carbon atoms, or a substituted or unsubstituted heteroaryl group having 2 to 10 carbon atoms, and substituents of the alkyl group, alkenyl group, alkynyl group, cycloalkyl group, aryl group, and heteroaryl group independently of one another are at least one selected from halogen, a carboxyl group (—COOH), an amino group (—NH$_2$), a nitro group (—NO$_2$), a cyano group (—CN), an alkyl group having 1 to 6 carbon atoms, an aryl group having 6 to 10 carbon atoms, and a cycloalkyl group having 3 to 10 carbon atoms.

In the L-homoserine derivative represented by Chemical Formula 6, for example, $R_1$ may be acetyl or succinyl. As the L-homoserine derivative represented by Chemical Formula 6 has such functional groups, L-glufosinate having improved optical purity can be more easily prepared.

The L-homoserine derivative represented by Chemical Formula 6 can be prepared, for example, from a fermentation liquid containing an L-homoserine derivative. Therefore, it is possible to efficiently prepare L-glufosinate by using the L-homoserine derivative represented by Chemical Formula 6 that is produced in the fermentation process.

As used herein, the term 'fermentation liquid containing an L-homoserine derivative' may be a fermentation liquid containing an L-homoserine derivative that is produced from a fermentation process. With respect to the fermentation, it may be the same as described above.

The first base may be, for example, at least one selected from NH$_3$, KOH, NaOH, CaSO$_4$, LiOH, NaH, KH, NaOCH$_3$, NaOCH$_2$CH$_3$, NaOC(CH$_3$)$_3$, KO C(CH$_3$)$_3$, K$_2$CO$_3$, Na$_2$CO$_3$, 1,8-diazabicyclo [5.4.0]undeca-7-ene (DBU), 1,5-diazabicyclo[4.3.0]nona-5-ene (DBN), tri(C$_1$-C$_4$ alkyl)amine, pyridine and n-butyllithium.

The first base may be particularly sodium hydroxide. The content of the first base may be, for example, 0.1 to 100 parts by weight, 0.1 to 50 parts by weight, 0.1 to 40 parts by weight, 0.1 to 30 parts by weight, 0.1 to 20 parts by weight, 0.1 to 10 parts by weight, 0.1 to 5 parts by weight, or 0.1 to 2 parts by weight, based on 100 parts by weight of the L-homoserine derivative represented by Chemical Formula 6. When the content of the first base is too low, it may have a slight effect on the reaction rate, and when the content of the first base is too large, by-products may increase. The step of preparing the third intermediate compound of Chemical Formula 7 may be carried out under a solvent. The solvent may be water or an organic solvent. When the first base is used and the solvent is water, the pH of the aqueous solution containing water may be 9 to 14, 10 to 14, or 12 to 14. As the reaction solution has a pH in this range, the L-homoserine based compound can be more easily prepared. In the step of preparing the L-homoserine based compound, the functional group transfer reaction may be carried out, for example, at a temperature of 20 to 150° C. In the step of preparing the L-homoserine based compound, the functional group transfer reaction may be carried out, for example, for 0.1 to 20 hours. As a functional group transfer reaction is carried out within the above temperature range and time range, the third intermediate compound may be more easily prepared.

In the step of preparing the third intermediate compound, the yield of the third intermediate compound may be, for example, 10% or more, 20% or more, 30% or more, 40% or more, 50% or more, 60% or more, 70% or more, 80% or more, 90% or more, 95% or more, 96% or more, 97% or more, 98% or more, or 99% or more.

In the step of preparing the third intermediate compound, the enantiomeric excess of the third intermediate compound may be, for example, 10% ee or more, 20% ee or more, 30% ee or more, 40% ee or more, 50% ee or more, 60% ee or more, 70% ee or more, 80% ee or more, 90% ee or more, 91% ee or more, 92% ee or more, 93% ee or more, 94% ee or more, 95% ee or more, 96% ee or more, 97% ee or more. 98% ee or more, or 99% ee or more.

Next, the third intermediate compound represented by Chemical Formula 7 can be reacted with the third acid to prepare a compound represented by Chemical Formula 1.

That is, the third intermediate compound represented by Chemical Formula 7 can be reacted and lactonized with a third acid to prepare a lactone compound represented by the following Chemical Formula 1. For example, the third intermediate compound represented by Chemical Formula 7 may form a lactone ring by the third acid.

<Chemical Formula 7>

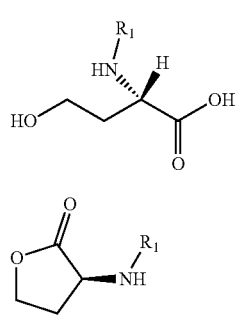

<Chemical Formula 1>

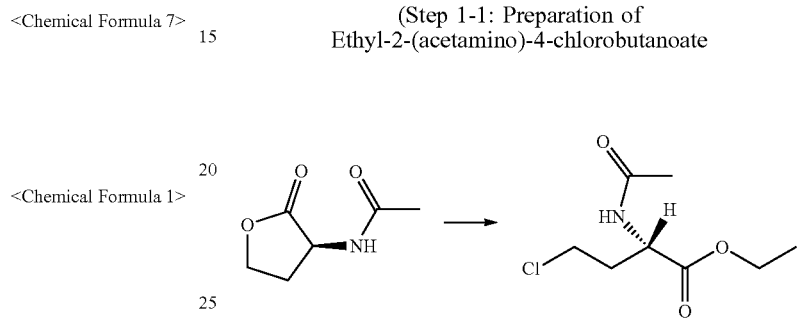

The third acid may be, for example, at least one selected from the group consisting of acetic acid, HCl, $H_2SO_4$, HBr and HI.

The content of the third acid can be appropriately selected depending on the type of acid used. For example, the third acid may be used in an amount of 0.1 or more with respect to the first intermediate compound represented by Chemical Formula 4. Specifically, in the case of hydrochloric acid or sulfuric acid, it may be 0.1 to 2 equivalents, 0.3 to 1.8 equivalents, or 0.5 to 1.5 equivalents, and in the case of acetic acid, it may be 10 equivalents or more, 20 equivalents or more, 10 equivalents to 50 equivalents, or 20 to 40 equivalents. When the content of the third acid is too low, it may have a slight effect on the reaction rate, and when the content of the third acid is too large, by-products may increase.

The step of preparing the compound of Chemical Formula 1 may be carried out in the presence of a solvent, or may be carried out under neat conditions without a solvent. The solvent may be water or an organic solvent.

In the step of preparing the compound of Chemical Formula 1, the lactone formation reaction may be carried out, for example, at a temperature of 20 to 150° C. In the step of preparing the first intermediate compound, the lactone formation reaction may be carried out, for example, for 0.1 to 20 hours. As the lactone formation reaction is carried out within the above temperature range and time range, the compound of Chemical Formula 1 can be more easily prepared.

In the step of preparing the compound of Chemical Formula 1, the yield of the compound of Chemical Formula 1 may be, for example, 10% or more, 20% or more, 30% or more, 40% or more, 50% or more, 60% or more, 70% or more, 80% or more, 90% or more, 95% or more, 96% or more, 97% or more, 98% or more, or 99% or more.

In the step of preparing the compound of Chemical Formula 1, the enantiomeric excess of the first intermediate compound having L-form may be, for example, 10% ee or more, 20% ee or more, 30% ee or more, 40% ee or more, 50% ee or more, 60% ee or more, 70% ee or more, 80% ee or more, 90% ee or more, 91% ee or more, 92% ee or more, 93% ee or more, 94% ee or more, 95% ee or more, 96% ee or more, 97% ee or more, 98% ee or more, or 99% ee or more.

The present application will be described in more detail with reference to examples and comparative examples. However, these examples are for illustrative purposes only, and the scope of the present application is not limited thereto.

Example 1: Preparation of L-glufosinate Using N-acetyl-L-homoserine lactone (Using the Second Intermediate Compound (1M (Step 1-1: Preparation of Ethyl-2-(acetamino)-4-chlorobutanoate

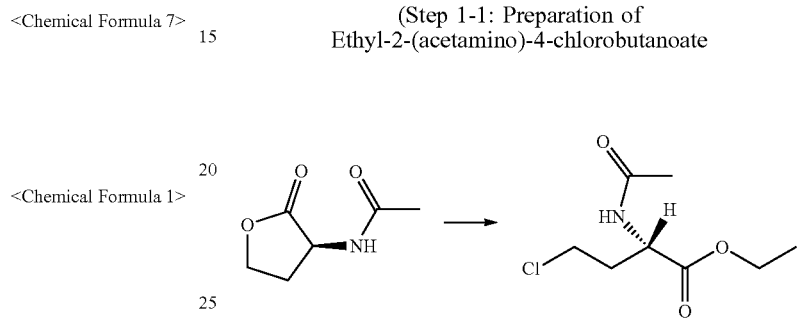

To a solution in which 4 g (28 mmol) of N-acetyl-L-homoserine lactone was dissolved in 60 mL of ethanol, thionyl chloride (6.6 g, 56 mmol) was slowly added at 0° C. to prepare a reaction solution. The prepared reaction solution was stirred at 80° C. for 3 hours. Then, 1N NaOH (aq) was added to the solution in which the reaction was completed, neutralized, and then concentrated under reduced pressure to prepare a concentrate. The prepared concentrate was diluted with ethyl acetate and washed once with brine. The organic layer was dried over anhydrous magnesium sulfate ($MgSO_4$), filtered, and the filtrate was concentrated under reduced pressure to obtain a residue containing ethyl-2 (acetylamino)-4-chlorobutanoate.

The resulting residue was separated by column chromatography (mobile phase, hexane:ethyl acetate=1:1) to obtain 5.12 g (yield: 88%) of ethyl-2-(acetylamino)-4-chlorobutanoate as a colorless oil.

$^1$H NMR (400 MHz, DMSO-d6): δ 4.49 (m, 1H), 4.22 (q, 2H), 3.60 (t, 2H), 2.25 (m, 2H), 1.91 (s, 3H), 1.30 (t, 3H)

(Step 1-2: Preparation of Ethyl-2-(acetamino)-4-(ethoxymethylphosphinyl)butanoate

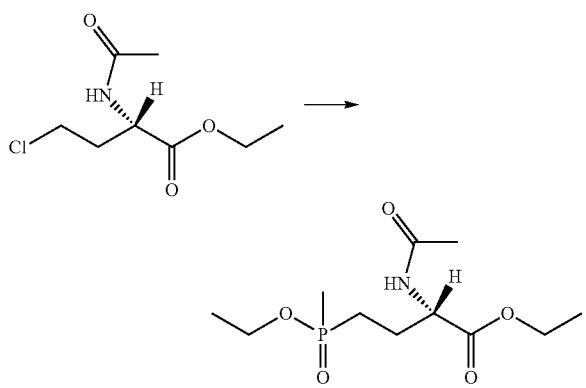

After ethyl-2-(acetamino)-4-chlorobutanoate (2.6 g, 12.6 mmol) and diethyl methylphosphonite (3.4 g, 25.2 mmol, 2 equiv.) were dissolved, nitrogen was injected therein, and then stirred at 120° C. for 12 hours. After completion of the reaction, unreacted diethylmethylphosphonite was removed at 80° C. under reduced pressure of 1 mmHg. The resulting residue was separated by column chromatography (mobile phase, ethyl acetate:isopropanol=4:1 volume ratio) to obtain 2.25 g (yield: 64%) of ethyl-2-(acetamino)-4(ethoxymethylphosphinyl)butanoate as a colorless oil.

$^1$H NMR (400 MHz, CDCl3): δ 4.40 (m, 1H), 4.20 (q, 2H), 3.99 (q, 2H), 2.01 (m, 4H), 1.91 (s, 3H), 1.45 (d, J=14 Hz, 3H), 1.30 (t, 3H), 1.26 (t, 3H). 31P NMR (CDCl$_3$, 121.47 MHz) δ 54.28.

(Step 1-3: Preparation of L-glufosinate (L-phosphinothricin) hydrochloride

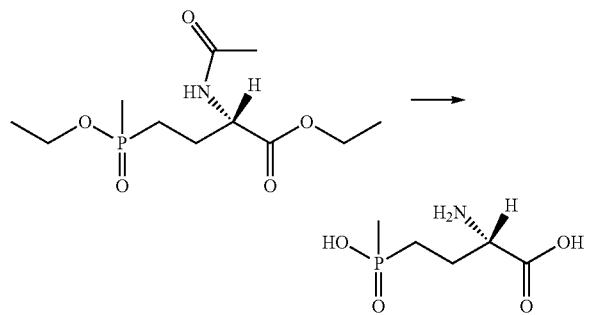

2 g (7.17 mmol) of ethyl-2-(acetamino)-4-(ethoxymethylphosphinyl)butanoate(V) was dissolved in 20 mL of 6N HCl, and then put into a sealing tube, and stirred at 120° C. for 15 hours. After completion of the hydrolysis reaction, the solvent was removed under reduced pressure to obtain 1.49 g of white L-glufosinate hydrochloride salt (yield: 96%; total yield of steps 1-1 to 1-3: 61%).

$^1$H NMR (400 MHz, DMSO-d6): δ 4.12 (m, 1H), 2.45-1.65 (m, 4H), 1.46 (d, J=14 Hz, 3H).

Reference Example 1: Preparation of N-Acetyl-L-Homoserine lactone

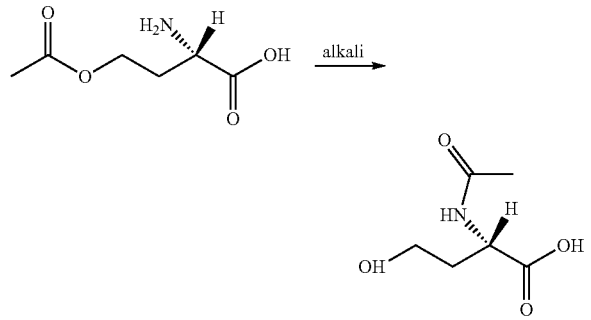

To an aqueous solution in which O-Acetyl-L-Homoserine (II) (1 g, 6.2 mmol) was dissolved in 30 mL of water, NaOH (40 wt. % aqueous solution) was slowly added as an alkali catalyst to prepare a reaction solution with a pH of 9. Then, the prepared reaction solution was stirred at 25° C. for 30 minutes. Then, the reaction solution was heated to 50° C. and stirred at 50° C. for 5 hours. Then, 1N HCl (aq) was added to the solution in which the reaction was completed, neutralized, and then concentrated under reduced pressure to prepare a concentrate. The prepared concentrate was cooled to 0° C., ethanol was added thereto, the mixture was stirred, and filtrated under reduced pressure to obtain 0.98 g (yield: 98%) of N-Acetyl-L-Homoserine (III-1) as a white solid.

$^1$H NMR (400 MHz, DMSO-d6): δ 7.68 (d, J=8 Hz, 1H), 3.96 (m, 1H), 3.40 (t, J=6.8 Hz, 2H), 1.83 (s, 3H), 1.81 (in, 1H), 1.61 (in, 1H)

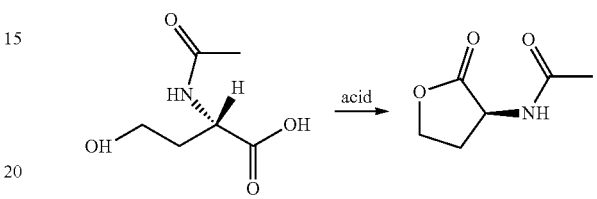

To an aqueous solution in which O-Acetyl-L-Homoserine (1 g, 6.2 mmol) was dissolved in 30 mL of water, c-HCl (conc. hydrochloric acid) was slowly added as an acid was to prepare a reaction solution with a pH of 2. The prepared reaction solution was stirred at 25° C. for 30 minutes. Then, the reaction solution was heated to 60° C. and then stirred at 60° C. for 3 hours. Then, 1N NaOH (aq.) was added to the solution in which the reaction was completed, neutralized, and then concentrated under reduced pressure to prepare a concentrate. The prepared concentrate was cooled to 0° C., and then isopropanol was added thereto, the mixture was stirred, stirred, and filtered under reduced pressure to obtain 0.87 g (yield: 98%) of N-Acetyl-L-Homoserine lactone as a white solid.

$^1$H NMR (400 MHz, DMSO-d6): δ 3.96 (in, 1H), 3.89 (t, J=6.8 Hz, 2H), 1.91 (s, 3H), 2.11 (in, 1H), 1.83 (m, 1H)

Example 2: Preparation of L-glufosinate Using N-succinyl-L-homoserine lactone (Using the Second Intermediate Compound (2

(Step 2-1: Preparation of Ethyl-2-(succinylamino)-4-chlorobutanoate

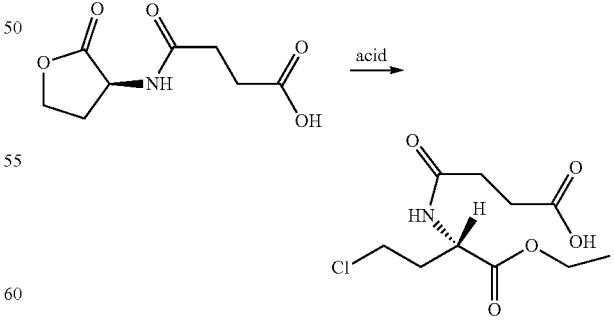

Ethyl-2-(succinoamino)-4-chlorobutanoate was prepared in the same manner as in Example 1 using N-succinyl-L-Homoserine lactone.

Subsequently, white L-glufosinate hydrochloride salt (total yield of 4 steps (step 1-2 and step 1-3): 51%) was obtained from ethyl-2-(succinoamino)-4-chlorobutanoate in the same manner as in Example 1.

$^1$H NMR (400 MHz, D2O): δ 4.12 (m, 1H), 2.45-1.65 (m, 4H), 1.46 (d, J=14 Hz, 3H).

Reference Example 2: Preparation of N-succinyl-L-homoserine lactone

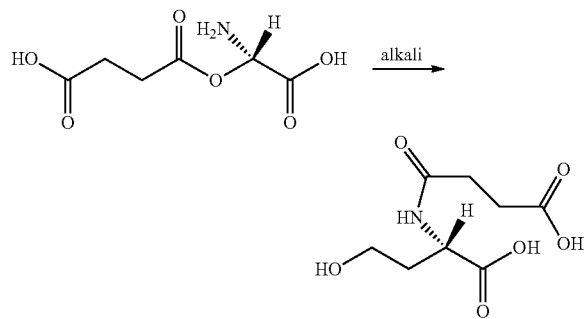

To an aqueous solution in which O-Succinyl-L-Homoserine (1 g, 4.57 mmol) was dissolved in 30 mL of water, NaOH (40 wt. % aqueous solution) was slowly added to prepare a reaction solution with a pH of 9.

Then, the prepared reaction solution was stirred at 25° C. for 30 minutes. Then, the reaction solution was heated to 50° C. and stirred at 50° C. for 5 hours. Then, 1N HCl (aq) was added to the solution in which the reaction was completed, neutralized, and then concentrated under reduced pressure to prepare a concentrate. The prepared concentrate was cooled to 0° C. ethanol was added thereto, the mixture was stirred, and filtered under reduced pressure. Thereby, 0.98 g (yield: 98%) of N-succinyl-L-Homoserine as a white solid was obtained.

$^1$H NMR (400 MHz, DMSO-d6): δ 7.68 (d, J=8 Hz, 1H), 3.96 (m, 1H), 3.40 (t, J=6.8 Hz, 2H), 2.55 (t, J=13 Hz, H), 2.31 (t, J=13 Hz, 2H), 1.83 (s, 3H), 1.81 (m, 1H), 1.61 (m, 1H)

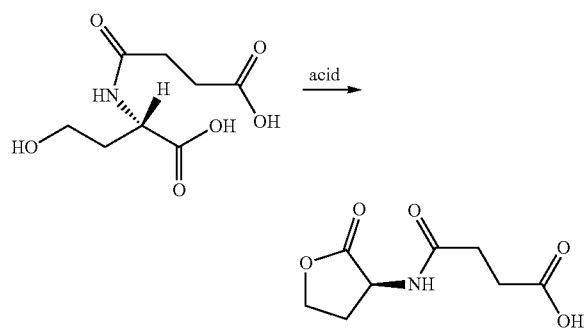

To an aqueous solution in which N-succinyl-L-Homoserine (1 g) was dissolved in 30 mL of water, c-HCl (conc. hydrochloric acid) was slowly added as an acid to prepare a reaction solution with a pH of 2. The prepared reaction solution was stirred at 25° C. for 30 minutes. Then, the reaction solution was heated to 60° C. and then stirred at 60° C. for 3 hours. Then, 1N NaOH (aq) was added to the solution in which the reaction was completed, neutralized, and then concentrated under reduced pressure to prepare a concentrate. The prepared concentrate was cooled to 0° C., ethanol was added thereto, the mixture was stirred and filtered under reduced pressure to obtain N-succinyl-L-homoserine lactone as a white solid (yield: 98%).

$^1$H NMR (400 MHz, DMSO-d6): δ 3.96 (m, 1H), 3.89 (t, J=6.8 Hz, 2H), 2.45 (t, J=13 Hz, 2H), 2.31 (t, J=13 Hz, 2H), 1.81 (m, 1H), 1.61

Example 3: Preparation of L-glufosinate Using N-acetyl-L-homoserine lactone (without Using the Second Intermediate Compound (1

(Step 3-1: Preparation of Ethyl-2-(acetamino)-4-(ethoxymethylphosphinyl)butanoate

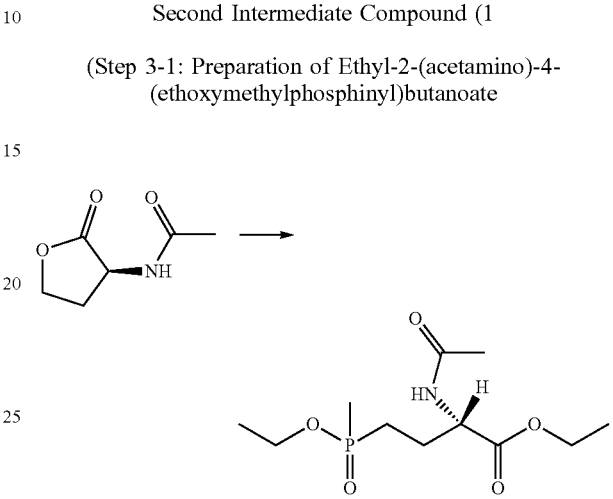

1.8 g (12.6 mmol) of N-acetyl-L-homoserine lactone was dissolved in 20 mL of ethanol, and then diethyl methylphosphonite (3.4 g, 25.2 mmol, 2 equiv.) and trimethylsilyl iodide (5.0 g, 25.2 mmol, 2 equiv.) were put into a sealing tube, and nitrogen was injected therein, and then stirred at 140° C. for 14 hours.

After completion of the reaction, unreacted diethyl methylphosphonite was removed at 80° C. under reduced pressure of 1 mmHg. The resulting residue was separated by column chromatography (mobile phase, ethyl acetate:isopropanol=4:1 volume ratio) to obtain 4.42 g (yield: 62.8%) of ethyl-2-(acetamino)-4-(ethoxymethylphosphinyl)butanoate as a colorless oil.

$^1$H NMR (400 MHz, CDCl3): δ 4.40 (m, 1H), 4.20 (q, 2H), 3.99 (q, 2H), 2.01 (m, 4H), 1.91 (s, 3H), 1.45 (d, J=14 Hz, 3H), 1.30 (t, 3H), 1.26 (t, 3H). $^{31}$P NMR (CDCl$_3$, 121.47 MHz) δ 54.28.

(Step 3-2: Preparation of L-glufosinate (L-phosphinothricin)hydrochloride

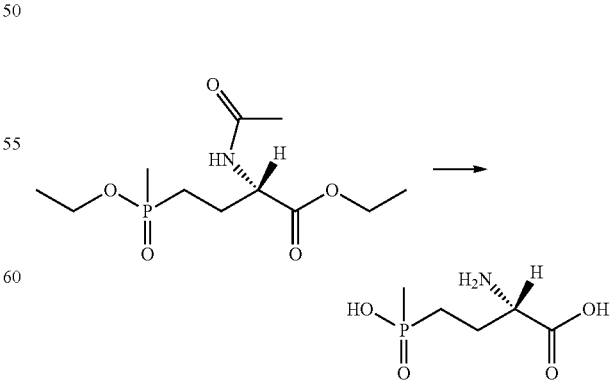

2 g (7.17 mmol) of ethyl-2-(acetamino)-4-(ethoxymethylphosphinyl)butanoate was dissolved in 20 mL of 6N HCl, and then put into a sealing tube, and stirred at 120° C. for 15 hours. After completion of the hydrolysis reaction, the solvent was removed under reduced pressure to obtain 1.49 g, (yield: 96%) of white L-glufosinate hydrochloride salt.

$^1$H NMR (400 MHz, D2O): δ 4.12 (m, 1H), 2.45-1.65 (m, 4H), 1.46 (d, J=14 Hz, 3H).

Example 4: Preparation of L-glufosinate Using N-succinyl-L-homoserine lactone (without Using the Second Intermediate Compound (2

(Step 4-1: Preparation of Ethyl-2-(succinylamino)-4-(ethoxyphosphinyl)butanoate

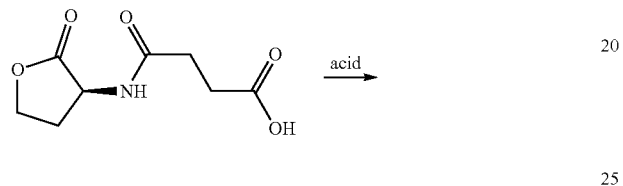

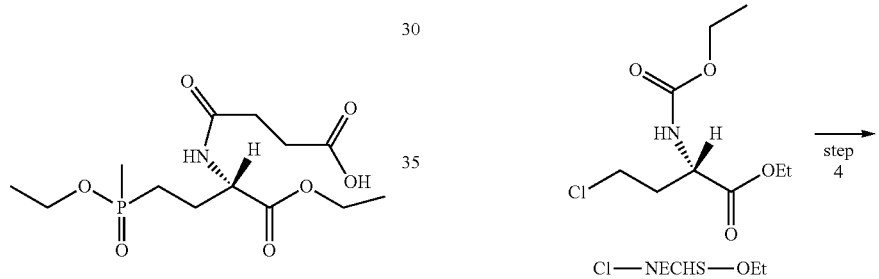

Ethyl-2-(succinylamino)-4-(ethoxyphosphinyl)butanoate was prepared in the same manner as in Example 1 using N-succinyl-L-Homoserine lactone.

Subsequently, ethyl-2-(succinylamino)-4-(ethoxyphosphinyl)butanoate was hydrolyzed in the same manner as in Example 1 to obtain white L-glufosinate hydrochloride salt (yield: 96%).

Comparative Example 1: Preparation of Racemic Glufosinate

Glufosinate was prepared according to the method disclosed in Example 1 of U.S. Pat. No. 6,359,162. The prepared glufosinate was a racemic mixture.

Comparative Example 2: Comparison with the Method for Producing L-Glufosinate which Introduces a Protecting Group into Homoserine Lactone In order to compare the method for preparing L-glufosinate that introduces a protecting group into homoserine lactone, and the reaction results, L-glufosinate was prepared according to the following Reaction Scheme 1.

[Reaction Scheme 1]

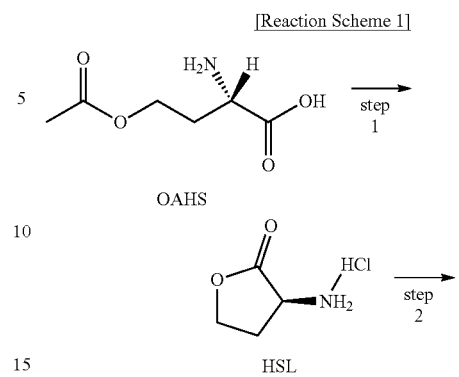

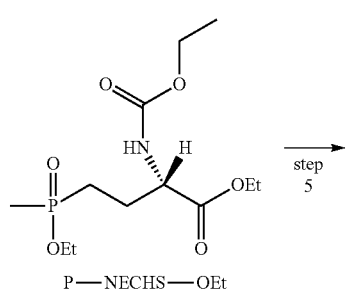

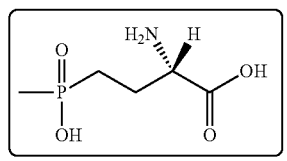

L-Glufosinate

The reaction conditions and reaction results of each reaction step are shown in Table 1 below.

TABLE 1

| Reaction section | Reaction route | Reaction condition | Reaction result |
|---|---|---|---|
| step 1 | OAHS to HSL | HCl 6 eq, 60° C. | HSL 95% |
|  |  | HCl 7 eq, 60° C. | HSL 96% |
|  |  | HCl 8 eq, 60° C. | HSL 97% |
| step 2 | HSL to NecHSL | Ethylchloroformate 1.2 eq, pH 5 | NecHSL 95% |
|  |  | Ethylchloroformate 1.2 eq, pH 3 | NecHSL 90% |
|  |  | Ethylchloroformtate 1.2 eq, pH 1.5 | NecHSL 54% |
| step 3 | NecHSL to Cl-NecHS-OEt | $SOCl_2$ 2 eq, EtOH 40 eq, 50° C. 16 h | Cl-NecHS-Oet 33% |
|  |  | $SOCl_2$ 2 eq, EtOH 40 eq, 50° C. 5 h | Cl-NecHS-Oet 26.9% |
|  |  | $SOCl_2$ 2 eq, EtOH 10 eq, RT 3 h | Cl-NecHS-Oet 72.3% |
|  |  | $SOCl_2$ 2 eq, EtOH 3.7 eq, RT 3 h | Cl-NecHS-Oet 85.4% |
|  |  | $SOCl_2$ 2 eq, EtOH 3.7 eq, 60° C. 3h | Cl-NecHS-Oet 98.7% |
| step 4 & 5 | Cl-NecHS-OEt to L-GluF | DMP 2 eq, 150° C. 16 h/6N HCl 20 times, 120° C. 14 h | GluF 66.02% |
|  |  | DMP 2 eq, 140° C. 16 h/6N HCl 20 times, 120 C. 14 h | GluF 73.4% |
|  |  | DMP 2 eq, 120° C. 14 h/6N HCl 20 times, 120° C. 14 h | GluF 61.7% |

(OAHS: O-Acetylhomoserine, HSL: Homoserine lactone, NecHSL: N-ethoxycarbonylhomoserine lactone, Cl-NecHSL-OEt: Ethyl-2-(ethoxycarbonylamino)-4-chlorobutanoate, P-NecHSL-OEt: Ethyl-2-(ethoxycarbonylamino)-4-(ethoxymethylphosphinyl)butanoate)

As shown in Table 1, when hydrochloric acid is used in the preparation of a lactone compound from an L-homoserine derivative, homoserine lactone shown in Reaction Scheme 1 is obtained.

The homoserine lactone is obtained, and the amine group in the homoserine lactone is protected with an ethoxycarbonyl group, which is then halogenated with a halogenating agent, bonded with a phosphorus-based compound, and hydrolyzed to prepare L-glufosinate. Thereby, it was confirmed that L-glufosinate is obtained in a low yield.

Experimental Example 1: Measurement of Enantiomeric Excess (% Ee

The enantiomeric excess of the L-glufosinate synthesized in Examples 1 to 4 and Comparative Example 1 is measured using chiral HPLC, and the results are shown in Table 1 below.

Chiral HPLC analysis was carried out with reference to the method disclosed in *J. Chromatogr.* 368, 413 (1986).

The enantiomeric excess (% ee) was determined using Sumichiral OA6100 (4.6×150 mm), Chiracel® OD-H (4.6× 250 mm), Sumichiral OA5000 (4.6×150 mm), or Chiralpak zwix (4.0×150 mm) chiral column. As the mobile phase, a co-solvent of 0-30% methanol, 0-70% acetonitrile, and 0-70% distilled water, or 2 mM copper sulfate aqueous solution was used, the solvent flow rate was 1.0 mL/min, the sample injection amount was 10 μL, and the UV detection wavelength was 200 nm to 280 nm.

TABLE 2

| Category | Enantiomeric excess [% ee] |
|---|---|
| Example 1 | 94 |
| Example 2 | 94 |
| Example 3 | 94 |
| Example 4 | 94 |
| Comparative Example 1 | Less than 1 |

As shown in Table 2, in the case of the glufosinate prepared in Examples 1 to 4, the enantiomeric excess of L-glufosinate was significantly as compared with the glufosinate prepared in Comparative Example 1. Therefore, it is possible to simply prepare L-glufosinate with high purity by the preparation method including the intermediate compound of the present invention.

Reference Example 1: Examination of pH Conditions when Preparing the L-Homoserine Based Compound Represented by Chemical Formula 7 from an L-Homoserine Derivative The pattern obtained according to the pH of the L-homoserine based compound represented by Chemical Formula 7 from the L-homoserine derivative represented by Chemical Formula 6 was confirmed. N-acetyl-L-Homoserine, which is an L-homoserine based compound, was obtained in the same manner as in the preparation method of Reference Example 1 (step 1-4) by using a starting material, O-Acetyl-L-homoserine, as an L-homoserine derivative, provided that the pH during the reaction was changed to 8.2, 9.2, 10.2, 12.7 and 13.4, respectively, and the results are shown in Table 3 below.

TABLE 3

| Reaction condition | Reaction result |
|---|---|
| 8.2 | NAHS 12.2%/OAHS 87.8% |
| 9.2 | NAHS 50.8%/OAHS 49.2% |
| 10.2 | NAHS 93.9%/OAHS 6.1% |
| 12.7 | NAHS 100%/OAHS 0% |
| 13.4 | NAHS 100%/OAHS 0% |

(O-Acetyl-L-Homoserine, NAHS: N-Acetyl-L-Homoserine)

As shown in Table 3, when the L-homoserine based compound represented by Chemical Formula 7 is prepared from the L-homoserine derivative represented by Chemical Formula 6, the yield of N-acetyl-L-Homoserine increased as the pH increased, especially, when the pH was 9 or higher, N-acetyl-L-Homoserine was obtained in high yield.

Reference Example 2: Examination of the Reaction Conditions when Preparing the First Intermediate Compound from L-Homoserine Based Compound The pattern obtained according to the reaction conditions of the lactone compound represented by Chemical Formula 1 from the L-homoserine based compound represented by Chemical Formula 7 was confirmed. An N-acetyl-L-Homoserine lactone, which is a compound represented by Chemical Formula 1, was obtained in the same manner as in the preparation method of Reference Example 1 (step 1-5) by using N-acetyl-L-Homoserine as the L-homoserine based compound, provided that the equivalent of the acid during the reaction and the reaction temperature were changed as shown in Tables 4 to 6, respectively, and the results are shown in Tables 4 to 6 below.

TABLE 4

| Acid | Main variable | Reaction condition | Reaction result |
|---|---|---|---|
| Acetic acid equivalent | Acetic acid | 1.3 equiv. | NAHSL 37.4%/NAHS 58.3% |
| | | 2.6 equiv. | NAHSL 72.1%/NAHS 24.5% |
| | | 7.8 equiv. | NAHSL 93.1%/NAHS 3.0% |
| | | 13 equiv. | NAHSL 95.0%/NAHS 1.1% |
| | | 18.2 equiv. | NAHSL 96.0%/NAHS 1.1% |
| | Reaction temperature | 25° C. | NAHSL 23.1%/NAHS 71.3% |
| | | 40° C. | NAHSL 63.1%/NAHS 30.3% |
| | | 60° C. | NAHSL 93.1%/NAHS 3.0% |
| | | 70° C. | NAHSL 93.7%/NAHS 2.7% |
| | | 100° C. | NAHSL 92.2%/NAHS 1.2% |

(NAHS: N-Acetyl-L-Homoserine, NAHSL: N-acetyl-L-Homoserine lactone)

As shown in Table 4, when the compound represented by Chemical Formula 1 was prepared from the L-homoserine based compound represented by Chemical Formula 7 using acetic acid, the yield of N-acetyl-L-Homoserine lactone increased as the acetic acid equivalent increased, and in particular, when the acetic acid equivalent was 2.6 or more, N-acetyl-L-Homoserine lactone was obtained in high yield.

As the reaction temperature increased, the yield of N-acetyl-L-Homoserine lactone increased, in particular, when the reaction temperature was 40° C. or higher, N-acetyl-L-Homoserine lactone was obtained in high yield.

TABLE 5

| Acid | Main variable | Reaction condition | Reaction result |
|---|---|---|---|
| Hydrochloric acid | Hydrochloric acid equivalent | 0.5 equiv. | NAHSL 16.4%/NAHS 80.7% |
| | | 0.75 equiv. | NAHSL 16.7%/NAHS 81.7% |
| | | 1.0 equiv. | NAHSL 72.7%/NAHS 22.4% |
| | | 1.25 equiv. | NAHSL 65.5%/NAHS 17.5% |
| | | 1.5 equiv. | NAHSL 43.8%/NAHS 9.9% |

As shown in Table 5, when the compound of Chemical Formula 1 was prepared from the L-homoserine based compound represented by Chemical Formula 7 using hydrochloric acid, the yield of N-acetyl-L-homoserine lactone increased as the sulfuric acid equivalent increased up to 1.0, and when applying 1.5 equivalents or more of hydrochloric acid, the yield of N-acetyl-L-Homoserine lactone gradually decreased.

TABLE 6

| Acid variable | Main condition | Reaction | Reaction result |
|---|---|---|---|
| Sulfuric acid | Sulfuric acid equivalent | 0.5 equiv. | NAHSL 54.2%/NAHS 44.4% |
| | | 1.0 equiv. | NAHSL 61.4%/NAHS 14.9% |
| | | 1.5 equiv. | NAHSL 38.9%/NAHS 8.2% |
| | | 2.0 equiv. | NAHSL 23.0%/NAHS 4.4% |

As shown in Table 6, when the compound of Chemical Formula 1 was prepared from the L-homoserine based compound represented by Chemical Formula 7 using sulfuric acid, the yield of N-acetyl-L-Homoserine lactone increased as the sulfuric acid equivalent increased up to 1.0, and when applying 1.5 equivalents or more of sulfuric acid, the yield of N-acetyl-L-Homoserine lactone gradually decreased.

Experimental Example 2: Experimental Example 5: Examination of Reaction Conditions when Preparing a First Intermediate Compound from the Compound of Chemical Formula 1

The pattern obtained according to the reaction conditions of the first intermediate compound represented by Chemical Formula 4 from the compound of Chemical Formula 1 was confirmed. The first intermediate compound, ethyl-2-(acetamino)-4-chlorobutanoate or methyl-2-(acetamino)-4-chlorobutanoate, was obtained in the same manner as in Example 1 (steps 1-1) by using N-acetyl-L-Homoserine lactone as the compound of Chemical Formula 1, provided that the equivalent of ethanol or methanol and the reaction temperature during the reaction were changed as shown in Tables 7 and 8 below, respectively, and the results are also shown in Tables 7 and 8 below.

TABLE 7

| Alcohol | Main variable | Reaction condition | Reaction result |
|---|---|---|---|
| Ethanol | Ethanol equivalent | 1 eq, 80° C. $SOCl_2$ 2 eq | Cl-NAHS-OEt 42.6% |
| | | 3 eq, 80° C. $SOCl_2$ 2 eq | Cl-NAHS-OEt 93.0% |
| | | 3.7 eq, 80° C. $SOCl_2$ 2 eq | Cl-NAHS-OEt 98.7% |
| | | 10 eq, 80° C. $SOCl_2$ 2 eq | Cl-NAHS-OEt 63.0% |
| | | 20 eq, 80° C. $SOCl_2$ 2 eq | Cl-NAHS-OEt 39.1% |

TABLE 7-continued

| Alcohol | Main variable | Reaction condition | Reaction result |
|---------|---------------|--------------------|-----------------|
|  | Reaction temperature | 3.7 eq, 0° C. SOCl$_2$ 2 eq | Cl-NAHS-OEt 0% |
|  |  | 3.7 eq, 25° C. SOCl$_2$ 2 eq | Cl-NAHS-OEt 12.6% |
|  |  | 3.7 eq, 40° C. SOCl$_2$ 2 eq | Cl-NAHS-OEt 60.8% |
|  |  | 3.7 eq, 60° C. SOCl$_2$ 2 eq | Cl-NAHS-OEt 97.5% |
|  |  | 3.7 eq, 80° C. SOCl$_2$ 2 eq | Cl-NAHS-OEt 98.7% |

(NAHSL: N-acetyl-L-Homoserine lactone, Cl-NAHS-OEt: Ethyl-2-(acetamino)-4-chlorobutanoate)

As shown in Table 7, when a first intermediate compound represented by Chemical Formula 4 was prepared from the compound of Chemical Formula 1 using ethanol, the yield of ethyl-2-(acetamino)-4-chlorobutanoate increased as the ethanol equivalent increased, and in particular, when the ethanol equivalent was 3 to 10 equivalents, ethyl-2-(acetamino)-4-chlorobutanoate was obtained in high yield.

As the reaction temperature increased, the yield of ethyl-2-(acetamino)-4-chlorobutanoate increased, and in particular, when the reaction temperature was 40° C. or higher, ethyl-2-(acetamino)-4-chlorobutanoate was obtained in high yield.

TABLE 8

| Alcohol | Main variable | Reaction condition | Reaction result |
|---------|---------------|--------------------|-----------------|
| Methanol | Methanol equivalent | 1 eq, 60° C. SOCl$_2$ 2 eq | Cl-NAHS-OMe 63.2% |
|  |  | 3 eq. 60° C. SOCl$_2$ 2 eq | Cl-NAHS-OMe 93.4% |
|  |  | 3.7 eq, 60° C. SOCl$_2$ 2 eq | Cl-NAHS-OMe 99.6% |
|  |  | 20 eq, 60° C. SOCl$_2$ 2 eq | Cl-NAHS-OMe 33.4% |
|  |  | 50 eq, 60° C. SOCl$_2$ 2 eq | Cl-NAHS-OMe 76.6% |
|  | Reaction temperature | 3.7 eq, 0° C. SOCl$_2$ 2 eq | Cl-NAHS-OMe 0% |
|  |  | 3.7 eq, 25° C. SOCl$_2$ 2 eq | Cl-NAHS-OMe 28.9% |
|  |  | 3.7 eq, 40° C. SOCl$_2$ 2 eq | Cl-NAHS-OMe 85.6% |
|  |  | 3.7 eq, 60° C. SOCl$_2$ 2 eq | Cl-NAHS-OMe 99.6% |

(NAHSL: N-acetyl-L-Homoserine lactone, Cl-NAHS-OMe: Methyl-2-(acetamino)-4-chlorobutanoate)

As shown in Table 8, when a first intermediate compound represented by Chemical Formula 4 was prepared from the compound of Chemical Formula 1 using methanol, the yield of methyl-2-(acetamino)-4-chlorobutanoate increased as the methanol equivalent increased, and in particular, when the ethanol equivalent was 3 to 10 equivalents, methyl-2-(acetamino)-4-chlorobutanoate was obtained in high yield.

As the reaction temperature increased, the yield of methyl-2-(acetamino)-4-chlorobutanoate increased, and in particular, when the reaction temperature was 40° C. or higher, methyl-2-(acetamino)-4-chlorobutanoate was obtained in high yield.

Experimental Example 3: Examination of Reaction Conditions when Preparing a Second Intermediate Compound from the First Intermediate Compound The pattern obtained according to the reaction conditions of the second intermediate compound represented by Chemical Formula 2 from the first intermediate compound represented by Chemical Formula 4 was confirmed. A second intermediate compound was obtained in the same manner as in the preparation method of Example 1 (step 1-2), except for using N-acetyl-L-homoserine as the first intermediate compound, provided that the type and equivalent of phosphorus-based compound and the reaction temperature during the reaction were changed as shown in Table 9, respectively, and the results are also shown in Table 9.

TABLE 9

| Main variable | Reaction condition | Reaction result |
|---------------|--------------------|-----------------|
| DMP equivalent | DMP 0.5 eq 140° C. 4 h | P-NAHS-Oet 7.9% |
|  | DMP 1 eq 140° C. 4 h | P-NAHS-Oet 22.2% |
|  | DMP 2 eq 140° C. 4 h | P-NAHS-Oet 68.7% |
|  | DMP 3 eq 140° C. 4 h | P-NAHS-Oet 69.3% |
|  | DMP 4 eq 140° C. 4 h | P-NAHS-Oet 67.7% |
|  | DMP 5 eq 140° C. 4 h | P-NAHS-Oet 58.6% |
| EMP equivalent | EMP 0.5 eq 140° C. 4 h | P-NAHS-Oet 7.4% |
|  | EMP 1 eq 140° C. 4 h | P-NAHS-Oet 72.5% |
|  | EMP 2 eq 140° C. 4 h | P-NAHS-Oet 63.7% |
| BMP equivalent | BMP 0.5 eq 140° C. 4 h | P-NAHS-Oet 8.9% |
|  | BMP 1 eq 140° C. 4 h | P-NAHS-Oet 68.2% |
|  | BMP 2 eq 140° C. 4 h | P-NAHS-Oet 69.7% |
| Reaction temperature | DMP 3 eq 80° C. 4 h | P-NAHS-Oet 3.9% |
|  | DMP 3 eq 100° C. 4 h | P-NAHS-Oet 12.2% |
|  | DMP 3 eq 120° C. 4 h | P-NAHS-Oet 48.7% |
|  | DMP 3 eq 140° C. 4 h | P-NAHS-Oet 69.3% |
|  | DMP 3 eq 160° C. 4 h | P-NAHS-Oet 70.2% |

(DMP: Diethyl methyl phosphonite, EMP: Ethyl methyl phosphonite, BMP: Butyl methylphosphonite, P-NAHS-Oet: Ethyl-2-(acetamino)-4-(ethoxymethylphosphinyl)butanoate)

As shown in Table 9, a second intermediate compound represented by Chemical Formula 2 can be prepared from the first intermediate compound represented by Chemical Formula 4 using AMP (alkyl methyl phosphonite) such as DMP or EMP or BMP as a phosphorus-based compound, and when 1 equivalent or more of DMP or AMP is used, the yield further increased. As the reaction temperature increased, the yield increased further, and in particular, in the case of 120° C. or higher, ethyl-2-(acetamino)-4-(ethoxymethylphosphinyl)butanoate was obtained in high yield.

Experimental Example 4: Examination of Reaction Conditions when Preparing the Second Intermediate Compound from the Compound of Chemical Formula 1

The pattern obtained according to the reaction conditions of the second intermediate compound represented by Formula 2 from the compound of Formula 1 was confirmed. A second intermediate compound was obtained in the same manner as in the preparation method of Example 2 (step 2-1) by using N-acetyl-L-Homoserine lactone as the compound of Formula 1, provided that the type and equivalent of the halogenating agent and the reaction temperature during the reaction were changed as shown in Tables 10 to 12, respectively, and the results are also shown in Tables 10 to 12.

TABLE 10

| Halogenating agent | Main variable | Reaction condition | Reaction result |
|---|---|---|---|
| TMSI, NaI | TMSI eq | TMSI 0.1 eq, DMP 2 eq 140° C. 14 h | P-NAHS-Oet 10.8% |
| | | TMSI 0.3 eq, DMP 2 eq 140° C. 14 h | P-NAHS-Oet 20.2% |
| | | TMSI 0.5 eq, DMP 2 eq 140° C. 14 h | P-NAHS-Oet 31.2% |
| | | TMSI 1 eq, DMP 2 eq 140° C. 14 h | P-NAHS-Oet 63.1% |
| | | TMSI 2 eq, DMP 2 eq 140° C. 14 h | P-NAHS-Oet 62.8% |
| | NaI eq | NaI 0.1 eq, DMP 2 eq 140° C. 14 h | P-NAHS-Oet 10.2% |
| | | NaI 0.3 eq, DMP 2 eq 140° C. 14 h | P-NAHS-Oet 11.2% |
| | | NaI 0.5 eq, DMP 2 eq 140° C. 14 h | P-NAHS-Oet 10.9% |
| | | NaI 1 eq, DMP 2 eq 140° C. 14 h | P-NAHS-Oet 12.8% |
| | | NaI 2 eq, DMP 2 eq 140° C. 14 h | P-NAHS-Oet 11.4% |
| | Reaction temperature | TMSI 1 eq, DMP 2 eq 80° C. 14 h | P-NAHS-Oet 22.2% |
| | | TMSI 1 eq, DMP 2 eq 100° C. 14 h | P-NAHS-Oet 43.8% |
| | | TMSI 1 eq, DMP 2 eq 120° C. 14 h | P-NAHS-Oet 52.9% |
| | | TMSI 1 eq, DMP 2 eq 140° C. 14 h | P-NAHS-Oet 63.1% |
| | | TMSI 1 eq, DMP 2 eq 160° C. 14 h | P-NAHS-Oet 61.2% |

TABLE 11

| Halogenating agent | Main paratmeter | Reaction condition | Reaction result |
|---|---|---|---|
| TMSBr | TMSBreq | TMSBr 0.1 eq, DMP 2 eq 140° C. 14 h | P-NAHS-Oet 7.7% |
| | | TMSBr 0.3 eq, DMP 2 eq 140° C. 14 h | P-NAHS-Oet 16.1% |
| | | TMSBr 0.5 eq, DMP 2 eq 140° C. 14 h | P-NAHS-Oet 25.2% |
| | | TMSBr 1 eq, DMP 2 eq 140° C. 14 h | P-NAHS-Oet 44.3% |
| | | TMSBr 2 eq, DMP 2 eq 140° C. 14 h | P-NAHS-Oet 47.8% |
| | Reaction temperature | TMSBr 1 eq, DMP 2 eq 80° C. 14 h | P-NAHS-Oet 22.2% |
| | | TMSBr 1 eq, DMP 2 eq 100° C. 14 h | P-NAHS-Oet 28.8% |
| | | TMSBr 1 eq, DMP 2 eq 120° C. 14 h | P-NAHS-Oet 35.9% |
| | | TMSBr 1 eq, DMP 2 eq 140° C. 14 h | P-NAHS-Oet 44.3% |
| | | TMSBr 1 eq, DMP 2 eq 160° C. 14 h | P-NAHS-Oet 40.5% |

TABLE 12

| Halogenating agent | Main variable | Reaction condition | Reaction result |
|---|---|---|---|
| TMSCl | TMSCleq | TMSCl 0.1 eq, DMP 2 eq 140° C. 14 h | P-NAHS-Oet 5.2% |
| | | TMSCl 0.3 eq, DMP 2 eq 140° C. 14 h | P-NAHS-Oet 13.2% |
| | | TMSCl 0.5 eq, DMP 2 eq 140° C. 14 h | P-NAHS-Oet 21.2% |
| | | TMSCl 1 eq, DMP 2 eq 140° C. 14 h | P-NAHS-Oet 30.1% |
| | | TMSCl 2 eq, DMP 2 eq 140° C. 14 h | P-NAHS-Oet 31.8% |
| | Reaction temperature | TMSCl 1 eq, DMP 2 eq 80° C. 14 h | P-NAHS-Oet 4.2% |
| | | TMSCl 1 eq, DMP 2 eq 100° C. 14 h | P-NAHS-Oet 10.5% |
| | | TMSCl 1 eq, DMP 2 eq 120° C. 14 h | P-NAHS-Oet 15.9% |
| | | TMSCl 1 eq, DMP 2 eq 140° C. 14 h | P-NAHS-Oet 26.1% |
| | | TMSCl 1 eq, DMP 2 eq 160° C. 14 h | P-NAHS-Oet 31.8% |

(TMSI: Trimethylsilyl iodide, TMSBr: Trimethylsilyl bromide, TMSCl: Trimethylsilylchloride, P-NAHS-Oet: Ethyl-2-(acetamino)-4-(ethoxymethylphosphinyl)butanoate)

As shown in Tables 10 to 12, a second intermediate compound represented by Chemical Formula 2 can be prepared from a compound of Chemical Formula 1 using trimethylsilyl halide such as TMSI, TMSBr, or TMSCl, or NaI as a halogenating agent. When 0.5 eq or more of trimethylsilyl halide was used, the yield was further increased. As the reaction temperature increased, the yield increased further, and in particular, in the case of 100° C. or higher, ethyl-2-(acetamino)-4-(ethoxymethylphosphinyl)butanoate was obtained in a high yield.

Among the trimethylsilyl halides, TMSI is the most reactive, and the reactivity tends to be slightly lower in the order of TMSBr and TMSCl, but ethyl-2-(acetamino)-4-(ethoxymethylphosphinyl)butanoate could be obtained from all of them.

Experimental Example 5: L-Glufosinate Reaction Conditions in the Second Intermediate Compound The pattern obtained according to the reaction conditions for the second intermediate compound represented by Chemical Formula 2 was confirmed. L-glufosinate was obtained in the same manner as in the preparation method of Example 1 (steps 1-3) by using ethyl-2-(acetamino)-4-(ethoxymethylphosphinyl)butanoate as the second intermediate compound, provided that the acid used, the reaction temperature, and the reaction time were changed as shown in Table 13 below, respectively, and the results are shown in Table 13.

TABLE 13

| Main variable | Reaction condition | Reaction result |
|---|---|---|
| Reaction time | 6N HCl, 120° C. 7 h | L-GluF 81% |
| | 6N HCl, 120° C. 10 h | L-GluF 88% |
| | 6N HC, 120° C. 15 h | L-GluF 100% |
| | 6N HCl, 120° C. 22 h | L-GluF 100% |

As shown in Table 13, L-glufosinate can be prepared from the second intermediate compound represented by Chemical Formula 2 by using 6N hydrochloric acid as an acid at 120° C., and when the reaction time was increased, the yield tended to increase further. In addition, it was confirmed that when the reaction was carried out for 15 hours or more, the yield further increased as the reaction temperature increased.

The invention claimed is:

1. A method for preparing L-glufosinate from an L-homoserine compound of the following Chemical Formula 1, the method comprising a step a of preparing a compound of the following Chemical Formula 2 from the compound of the following Chemical Formula 1, and a step b of preparing a compound of the following Chemical Formula 3 from the compound of Chemical Formula 2,
wherein the step a comprises a step a-1 of preparing the compound of Chemical Formula 2 by reacting the compound of Chemical Formula 1 with a halogenating agent, at least one $R_2$—OH, and a compound of the following Chemical Formula 5,

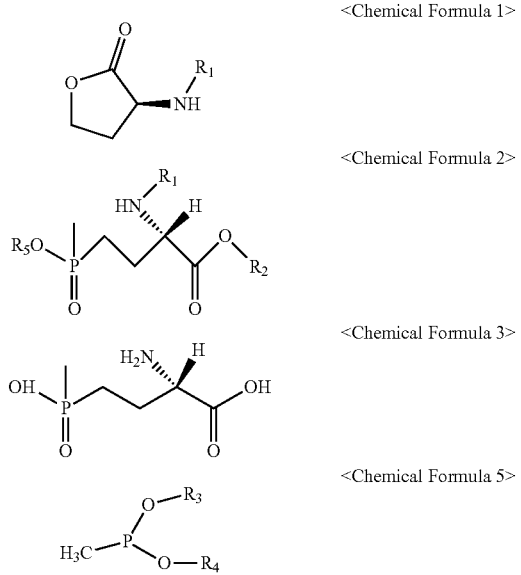

where in the above formulas,
$R_1$ is $R_a$—(C=O)—, where $R_a$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, a substituted or unsubstituted aryl group having 6 to 20 carbon atoms, or a substituted or unsubstituted heteroaryl group having 2 to 10 carbon atoms, $R_2$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, a substituted or unsubstituted cycloalkyl group having 3 to 10 carbon atoms, or a substituted or unsubstituted aryl group having 6 to 20 carbon atoms, a substituted or unsubstituted heteroaryl group having 2 to 10 carbon atoms, or —Si($R_b$)($R_c$)($R_d$), where $R_b$, $R_c$ and $R_d$ independently of one another are a substituted or unsubstituted alkyl group having 1 to 6 carbon atoms or a substituted or unsubstituted aryl group having 6 to 20 carbon atoms, $R_3$ and $R_4$ independently of one another are hydrogen, a substituted or unsubstituted alkyl group having 1 to 6 carbon atoms, a substituted or unsubstituted alkenyl group having 1 to 6 carbon atoms, or a substituted or unsubstituted alkynyl group having 1 to 6 carbon atoms, $R_5$ is hydrogen, a substituted or unsubstituted alkyl group having 1 to 6 carbon atoms, a substituted or unsubstituted alkenyl group having 1 to 6 carbon atoms, a substituted or unsubstituted alkynyl group having 1 to 6 carbon atoms, and substituents of the alkyl group, alkenyl group, alkynyl group, cycloalkyl group, aryl group, and heteroaryl group independently of one another are at least one selected from hydrogen, halogen, a carboxyl group (—COOH), an amino group (—NH$_2$), a nitro group (—NO$_2$), a cyano group (—CN), an alkyl group having 1 to 6 carbon atoms, an aryl group having 6 to 10 carbon atoms, and a cycloalkyl group having 3 to 10 carbon atoms.

2. The method for preparing L-glufosinate according to claim 1, wherein the $R_1$ is acetyl or succinyl.

3. The method for preparing L-glufosinate according to claim 1, wherein the $R_2$ is any one selected from the group consisting of hydrogen, methyl, ethyl, propyl, butyl, pentyl, hexyl, benzyl, phenyl and naphthyl.

4. The method for preparing L-glufosinate according to claim 1, wherein the $R_3$ and $R_4$ independently of one another are selected from the group consisting of methyl, ethyl, propyl, butyl, pentyl and hexyl.

5. The method for preparing L-glufosinate according to claim 1, wherein the compound of Chemical Formula 1 is prepared from a fermentation liquid containing the precursor of the compound of Chemical Formula 1.

6. The method for preparing L-glufosinate according to claim 1, wherein the halogenating agent includes at least one selected from the group consisting of HCl, HBr, HI, phosgene, SOCl$_2$, oxalyl chloride, trimethylsilyl halide, sodium iodide (NaI), triethylsilane, (CH$_2$CH$_3$)$_3$SiH)+palladium chloride (PdCl$_2$)+methyl iodide (CH$_3$I), POCl$_3$, PCl$_3$, PCl$_5$, PBr$_3$, PI$_3$, H$_2$SO$_4$+KBr, P+Cl$_2$, P+Br$_2$, P+I$_2$, TiCl$_4$, ZnCl$_2$ and BBr$_3$.

7. The method for preparing L-glufosinate according to claim 1, wherein the $R_2$—OH includes at least one selected from the group consisting of methanol, ethanol, n-propanol, iso-propanol, butanol, pentanol, hexanol, benzyl alcohol, phenol and naphthol.

8. The method for preparing L-glufosinate according to claim 1, wherein a content of the $R_2$—OH is 1 to 60 equivalents based on 1 equivalent of the compound of Chemical Formula 1.

9. The method for preparing L-glufosinate according to claim 1, wherein a content of the halogenating agent is 0.1 to 10 equivalents based on 1 equivalent of the compound of Chemical Formula 1.

10. The method for preparing L-glufosinate according to claim 1, wherein the step c is carried out at a temperature of 20 to 100° C. for a reaction time of 0.1 to 30 hours.

11. The method for preparing L-glufosinate according to claim 1, wherein the compound of Chemical Formula 5 includes any one selected from the group consisting of diethylmethylphosphinate (DMP), ethylmethylphosphinate (EMP) and butylmethylphosphinate (BMP).

12. The method for preparing L-glufosinate according to claim 1, wherein the content of the compound of Chemical Formula 5 is 0.5 to 10 equivalents based on 1 equivalent of the compound of Chemical Formula 1.

13. The method for preparing L-glufosinate according to claim 1, wherein the step a-1 is carried out at a temperature of 80 to 180° C. for 0.1 to 20 hours.

14. The method for preparing L-glufosinate according to claim 1, wherein the step b is carried out by hydrolyzing the compound of Chemical Formula 2 under an acid catalyst.

15. The method for preparing L-glufosinate according to claim 14, wherein the acid catalyst includes at least one selected from the group consisting of acetic acid, HCl, $H_2SO_4$ and $KF$—$Al_2O_3$.

16. The method for preparing L-glufosinate according to claim 1, wherein the step b is carried out at a temperature of 20 to 150° C. for 0.1 to 30 hours.

17. The method for preparing L-glufosinate according to claim 1, wherein the L-glufosinate includes at least one selected from hydrochloride of L-glufosinate, sulfate of L-glufosinate, carbonate of L-glufosinate, sodium salt of L-glufosinate, and ammonium salt of L-glufosinate.

\* \* \* \* \*